US005896155A

United States Patent [19]

Lebens et al.

[11] Patent Number: 5,896,155

[45] Date of Patent: Apr. 20, 1999

[54] INK TRANSFER PRINTING APPARATUS WITH DROP VOLUME ADJUSTMENT

[75] Inventors: John Andrew Lebens, Rush; James Michael Chwalek, Pittsford; Pranab Bagchi, Webster, all of N.Y.

[73] Assignee: Eastman Kodak Company, Rochester, N.Y.

[21] Appl. No.: 08/808,590

[22] Filed: Feb. 28, 1997

[51] Int. Cl.[6] ........ G01D 15/16

[52] U.S. Cl. ........ 346/140.1; 347/100; 106/31.59

[58] Field of Search ........ 346/140.1; 347/54, 347/44, 100; 106/31.59

[56] References Cited

U.S. PATENT DOCUMENTS

| | | | |
|---|---|---|---|
| 3,946,398 | 3/1976 | Kyser et al. | 347/70 |
| 4,166,277 | 8/1979 | Cielo et al. | 347/55 |
| 4,275,290 | 6/1981 | Cielo et al. | 347/48 X |
| 4,490,728 | 12/1984 | Vaught et al. | 347/60 |
| 4,675,694 | 6/1987 | Bupara | 346/140.1 |
| 4,751,531 | 6/1988 | Saito et al. | 347/55 |
| 4,782,347 | 11/1988 | Kurematsu | 346/140.1 |
| 5,481,280 | 1/1996 | Lam et al. | 346/140.1 |
| 5,726,693 | 3/1998 | Sharma | 347/54 X |

FOREIGN PATENT DOCUMENTS

| | | | |
|---|---|---|---|
| 2007 162 | 5/1979 | United Kingdom | B41J 3/04 |

*Primary Examiner*—Joseph Hartary
*Attorney, Agent, or Firm*—Milton S. Sales

[57] ABSTRACT

A liquid ink, drop on demand page-width printhead comprises a semiconductor substrate, a plurality of drop-emitter nozzles fabricated on the substrate; an ink supply manifold coupled to the nozzles; pressure means for subjecting ink in the manifold to a pressure above ambient pressure causing a meniscus to form in each nozzle; a means for applying heat to the perimeter of the meniscus in predetermined selectively addressed nozzles; a means for controlling the volume of poised drops in the selectively addressed nozzles; and a means for transferring the poised drops onto the recording media.

10 Claims, 5 Drawing Sheets

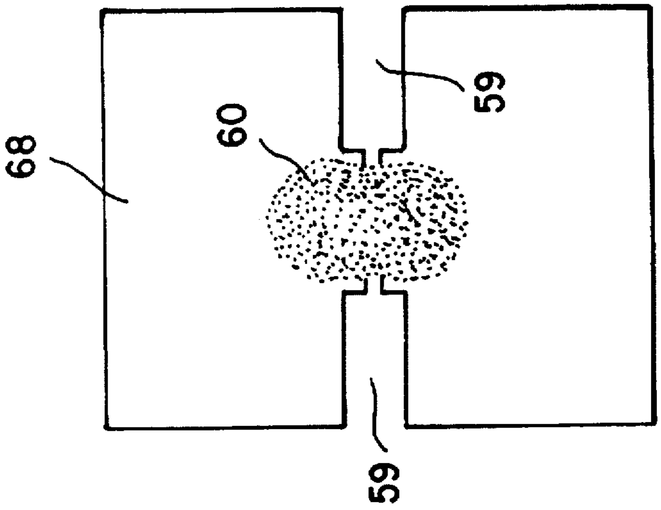
Fig.(4c)
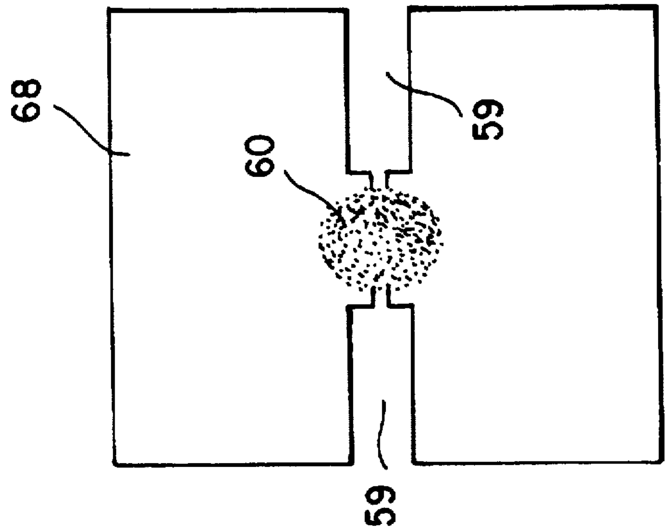
Fig.(4b)
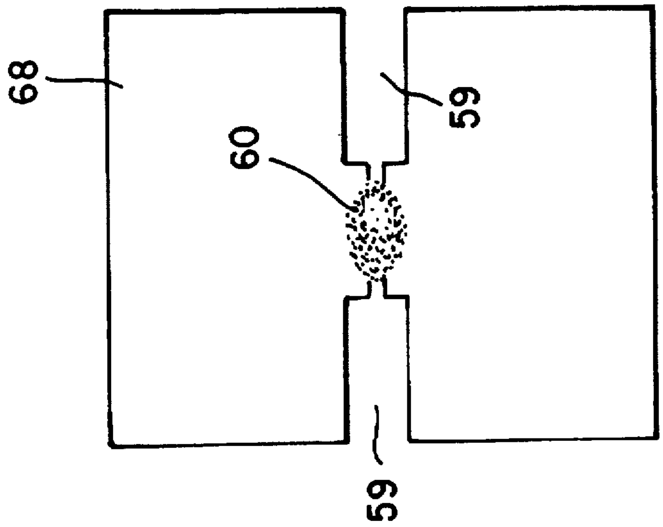
Fig.(4a)

INK TRANSFER PRINTING APPARATUS WITH DROP VOLUME ADJUSTMENT

CROSS-REFERENCE TO RELATED APPLICATIONS

Reference is made to Commonly assigned U.S. patent applications Ser. No. 08/750,438 entitled A LIQUID INK PRINTING APPARATUS AND SYSTEM filed in the name of Kia Silverbrook on Dec. 3, 1996, and Ser. No. 08/777,133 INK COMPOSITION CONTAINING SURFACTANT SOLS COMPRISING MIXTURES OF SOLID SURFACTANTS filed in the name of P. Bagchi et al on Dec. 30, 1996.

BACKGROUND OF THE INVENTION

1. Field of the Invention

This invention relates generally to the field of digitally controlled ink transfer printing devices, and in particular to liquid ink drop-on-demand printheads which may integrate multiple nozzles on a single substrate and in which the volume of a poised liquid meniscus on a nozzle, controlled by thermal activation, can be preset.

2. Background Art

Ink jet printing has become recognized as a prominent contender in the digitally controlled, electronic printing arena because, e.g., of its non-impact, low-noise characteristics, its use of plain paper and its avoidance of toner transfers and fixing. Ink jet printing mechanisms can be categorized as either continuous ink jet or drop-on-demand inkjet. U.S. Pat. No. 3,946,398, which issued to Kyser et al. in 1970, discloses a drop-on-demand ink jet printer which applies a high voltage to a piezoelectric crystal, causing the crystal to bend, applying pressure on an ink reservoir and jetting drops on demand. Other types of piezoelectric drop-on-demand printers utilize piezoelectric crystals in push mode, shear mode, and squeeze mode. Piezoelectric drop-on-demand printers have achieved commercial success at image resolutions up to 720 dpi for home and office printers. However, piezoelectric printing mechanisms usually require complex high voltage drive circuitry and bulky piezoelectric crystal arrays, which are disadvantageous in regard to manufacturability and performance.

Great Britain Pat. No. 2,007,162, which issued to Endo et al. in 1979, discloses an electrothermal drop-on-demand ink jet printer which applies a power pulse to an electrothermal heater which is in thermal contact with water based ink in a nozzle. A small quantity of ink rapidly evaporates, forming a bubble which cause drops of ink to be ejected from small apertures along the edge of the heater substrate. This technology is known as Bubblejet™ (trademark of Canon K.K. of Japan).

U.S. Pat. No. 4,490,728, which issued to Vaught et al. in 1982, discloses an electrothermal drop ejection system which also operates by bubble formation to eject drops in a direction normal to the plane of the heater substrate. As used herein, the term "thermal ink jet" is used to refer to both this system and system commonly known as Bubblejet™.

Thermal ink jet printing typically requires a heater energy of approximately 20 μJ over a period of approximately 2 μsec to heat the ink to a temperature between 280° C. and 400° C. to cause rapid, homogeneous formation of a bubble. The rapid bubble formation provides the momentum for drop ejection. The collapse of the bubble causes a tremendous pressure pulse on the thin film heater materials due to the implosion of the bubble. The high temperatures needed necessitates the use of special inks, complicates the driver electronics, and precipitates deterioration of heater elements. The 10 Watt active power consumption of each heater is one of many factors preventing the manufacture of low cost high speed pagewidth printheads.

U.S. Pat. No. 4,275,290, which issued to Cielo et al., discloses a liquid ink printing system in which ink is supplied to a reservoir at a predetermined pressure and retained in orifices by surface tension until the surface tension is reduced by heat from an electrically energized resistive heater, which causes ink to issue from the orifice and to thereby contact a paper receiver. This system requires that the ink be designed so as to exhibit a change, preferably large, in surface tension with temperature. The paper receiver must also be in close proximity to the orifice in order to separate the drop from the orifice.

U.S. Pat. No. 4,166,277, which also issued to Cielo et al., discloses a related liquid ink printing system in which ink is supplied to a reservoir at a predetermined pressure and retained in orifices by surface tension. The surface tension is overcome by the electrostatic force produced by a voltage applied to one or more electrodes which lie in an array above the ink orifices, causing ink to be ejected from selected orifices and to contact a paper receiver. The extent of ejection is claimed to be very small in the above Cielo patents, as opposed to an "ink jet", contact with the paper being the primary means of printing an ink drop. This system is disadvantageous, in that a plurality of high voltages must be controlled and communicated to the electrode array. Also, the electric fields between neighboring electrodes interfere with one another. Further, the fields required are larger than desired to prevent arcing, and the variable characteristics of the paper receiver such as thickness or dampness can cause the applied field to vary.

In U.S. Pat. No. 4,751,531, which issued to Saito, a heater is located below the meniscus of ink contained between two opposing walls. The heater causes, in conjunction with an electrostatic field applied by an electrode located near the heater, the ejection of an ink drop. There are a plurality of heater/electrode pairs, but there is no orifice array. The force on the ink causing drop ejection is produced by the electric field, but this force is alone insufficient to cause drop ejection. That is, the heat from the heater is also required to reduce either the viscous drag and/or the surface tension of the ink in the vicinity of the heater before the electric field force is sufficient to cause drop ejection. The use of an electrostatic force alone requires high voltages. This system is thus disadvantageous in that a plurality of high voltages must be controlled and communicated to the electrode array. Also the lack of an orifice array reduces the density and controllability of ejected drops.

Each of the above-described ink jet printing systems has advantages and disadvantages. However, there remains a widely recognized need for an improved ink jet printing approach, providing advantages for example, as to cost, speed, quality, reliability, power usage, simplicity of construction and operation, durability and consumables.

Commonly assigned U.S. patent application Ser. No. 08/750,438 entitled A LIQUID INK PRINTING APPARATUS AND SYSTEM filed in the name of Kia Silverbrook on Dec. 3, 1996, discloses a liquid printing system that affords significant improvements toward overcoming the prior art problems associated with drop size and placement accuracy, attainable printing speeds, power usage, durability, thermal stresses, other printer performance characteristics, manufacturability, and characteristics of useful inks. The invention provides a drop-on-demand printing mechanism wherein the means of selecting drops to be printed produces a difference in position between selected drops and drops which are not selected, but which is insufficient to cause the ink drops to overcome the ink surface tension and separate from the body of ink, and wherein an additional means is provided to cause separation of said selected drops from said body of ink. To cause separation of the drop the system requires either proximity mode, for which the paper receiver must be in close proximity to the orifice in order to separate the drop from the orifice, or the use of an electric field between paper receiver and orifice which increases the system complexity and has the possibility of arcing.

In Lam et al., U.S. Pat. No. 5,481,280, a method is described using reduction of viscosity by heating of the fluid to enable a controlled amount of the colored ink to flow through a nozzle onto the ink transfer surface which can be then transferred to the printing media by contacting the media. In this method the ink volume to be printed must be heated to a temperature close to 100° C. to achieve the necessary viscosity change. Depending on the quiescent viscosity of the ink the nozzle refill time could be slow, leading to slow printing speeds.

SUMMARY OF THE INVENTION

The present invention utilizes a unique ink system which provides a novel and non-obvious technique for printing which has the potential for a wide range of applicability. The volume of a drop poised on a nozzle orifice can be controlled by electrothermal pulses and remain stable until transferred to printing media. Heat pulses required to control drop volume are at a comparably low power level, allowing the printhead to be page-width length. Low viscosity of the ink enhances refill time. Variable control the ink volume of the drop permits continuous toning and gray scale toning to be accomplished with this invention.

It is an object of the present invention to provide a new mode of operation for an ink transfer printing device. The operating principle of the present invention is to poise a variably-controllable volume of ink on a nozzle by thermally controlling release of a surface-active agent contained in the ink. A pre-configured ink volume can then be transferred to printing media.

Under ambient conditions, the ink, containing a surface-active agent, is pressurized at above atmospheric but below critical pressure of the nozzle to form a meniscus of ink. This pressure determines a quiescent meniscus height of the nozzle. We have found that an electrothermal pulse selectively applied to the nozzle causes the surface-active agent in the ink to be released and to move to the surface of the ink. A corresponding decrease in surface tension causes an expansion of the meniscus, increasing its height and volume. This increase can be controlled by the amount of thermal energy delivered to the meniscus. The ink's material properties are such that the expanded state may be halted at a predetermined point and remain so for a predetermined period of time, such as for example about 100 μsec. or more, after termination of the electrothermal pulse or pulses, thus forming ink drops of predetermined size and volume.

Once the meniscus has been poised, drops can be transferred to a printing media. The drops may be transferred by contacting the printing media with the selected ink meniscus. Alternatively, it may be preferable to initially transfer the ink drops to an intermediate surface and, thereafter, transfer the ink drops from the intermediate surface to the printing media.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 1(*b*) shows a cross section of the nozzle tip in accordance with the invention.

FIG. 1(*c*) shows a top view of the nozzle tip in accordance with the invention.

FIG. 2(*b*) shows the meniscus of three selected nozzles.

FIGS. 4(*a*) to 4(*c*) shows the meniscus of three nozzles. One at its quiescent position and two have been selected at different volumes in accordance with the invention. The expanded menisci remain at their expanded volume for a predetermined period of time after termination of the electrothermal pulse responsible for their creation.

DESCRIPTION OF THE PREFERRED EMBODIMENT

Figure 1A:
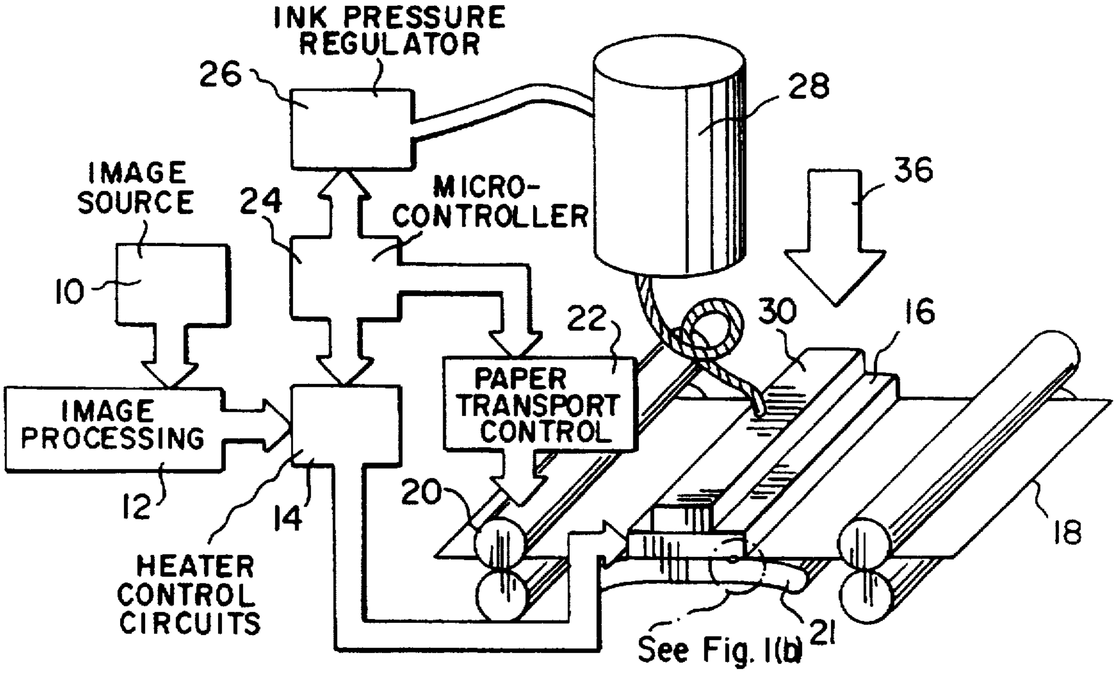
FIG. 1(*a*) shows a simplified block schematic diagram of one exemplary printing apparatus according to the present invention.
Figure 1B:
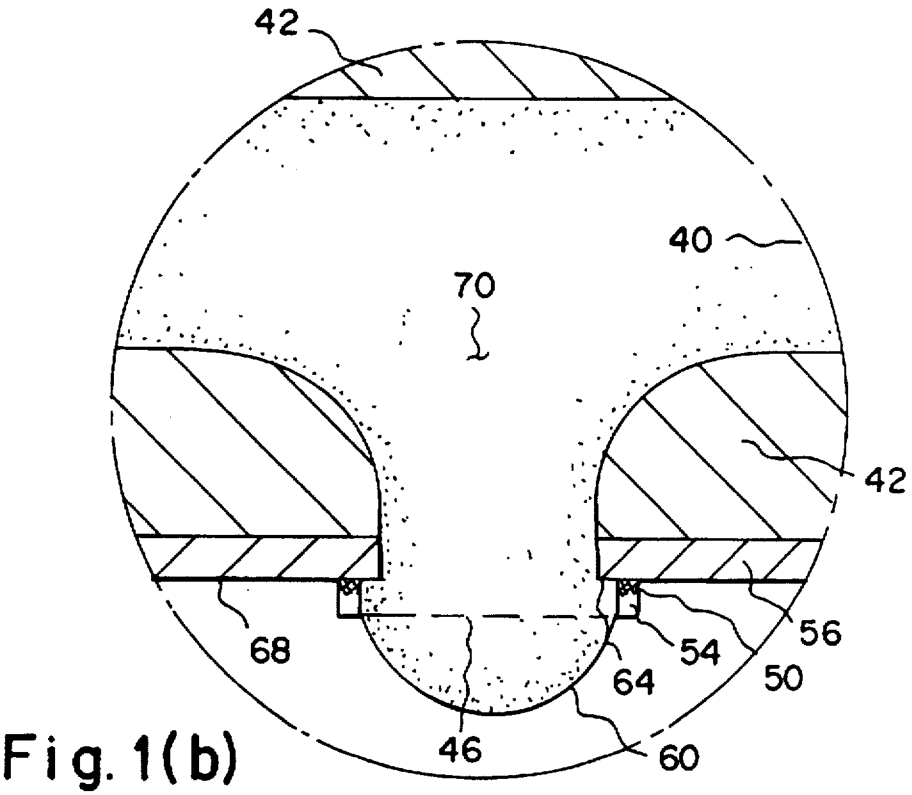
Figure 1C:
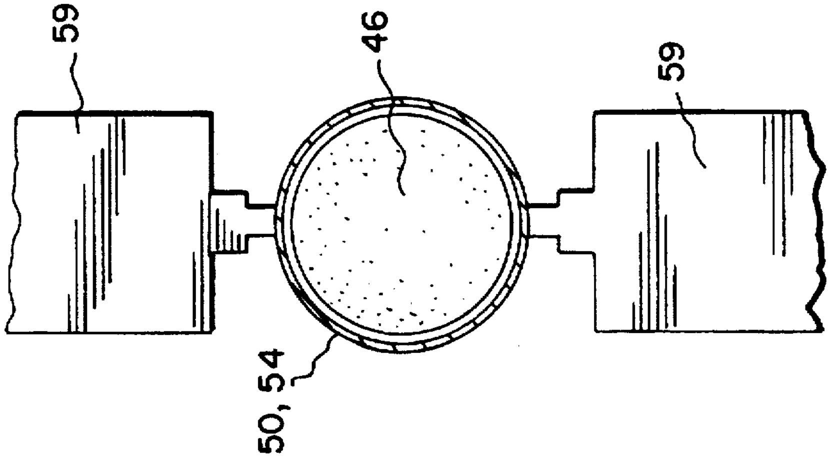

FIG. 1(*a*) is a drawing of an ink transfer system utilizing a printhead which is capable of producing a drop of controlled volume. An image source 10 may be raster image data from a scanner or computer, or outline image data in the form of a page description language, or other forms of digital image representation. This image data is converted by an image processing unit 12 to a map of the thermal activation necessary to provide the proper volume of ink for each pixel. This map is then transferred to image memory. Heater control circuits 14 read data from the image memory and apply time-varying or multiple electrical pulses to selected nozzle heaters that are part of a printhead 16. These pulses are applied for an appropriate time, and to the appropriate nozzle, so that selected drops with controlled volumes of ink will form spots on a recording medium 18 after transfer in the appropriate position as defined by the data in the image memory.

Recording medium 18 is moved relative to printhead 16 by a paper transport roller 20, which is electronically controlled by a paper transport control system 22, which in turn is controlled by a micro-controller 24. As shown in more detail in FIG. 2(*a*), the recording medium is tensioned against a platen 21. The platen should have a highly polished and optically flat surface to reduce friction with the recording medium, and to maintain positioning accuracy across the entire print region. The platen may be alternatively formed by two or more rollers (not shown) to reduce friction further. The rollers may be surrounded by a band (not shown) to maintain positional accuracy of the recording medium. The platen is fixed to a piezoelectric ceramic 31 which has an axis of polarization 33. The piezoelectric crystal is fixed to a plate 29 which is mechanically fixed in relation to printhead 16 during printing. Electrodes 32 are applied to piezoelectric crystal 31. To print the selectively poised drops located on the printhead surface, a voltage is applied to electrodes 32 causing the printhead to contact the recording medium.

Ink 70 is supplied to the printhead by an ink channel assembly 30. Ink channel assembly 30 may also serve the function of holding the printhead rigidly in place, and of correcting warp in the printhead. Alternatively, these functions may be provided by other structures. Power to actuate the thermal heaters is supplied by the two power connections 38 and 39. Because these connections can be manufactured from a conductive metal which can readily be several hundred microns thick, and because these connections may be the entire length of the printhead, high currents can be supplied to the printhead with a small voltage drop. This is important, as page width color printheads may consume as much as twenty Amps when several thousand nozzles are actuated simultaneously.

Figure 2A:
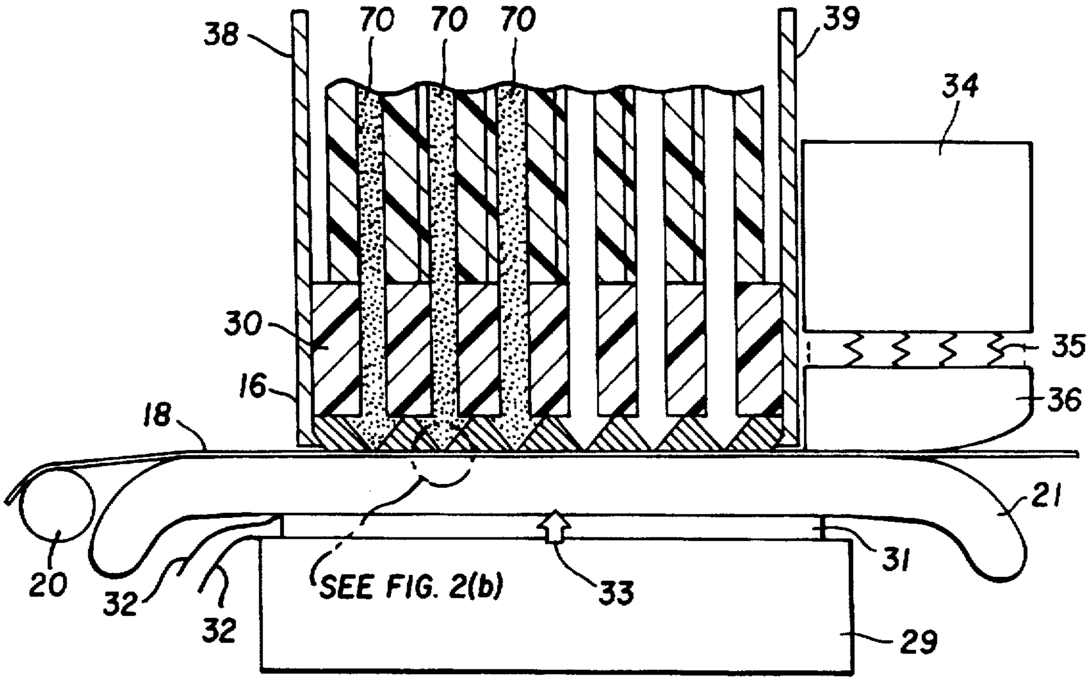
FIG. 2(*a*) shows a cross section of an ink transfer printhead and platen assembly for a web fed printing system according to the present invention.
Figure 2B:
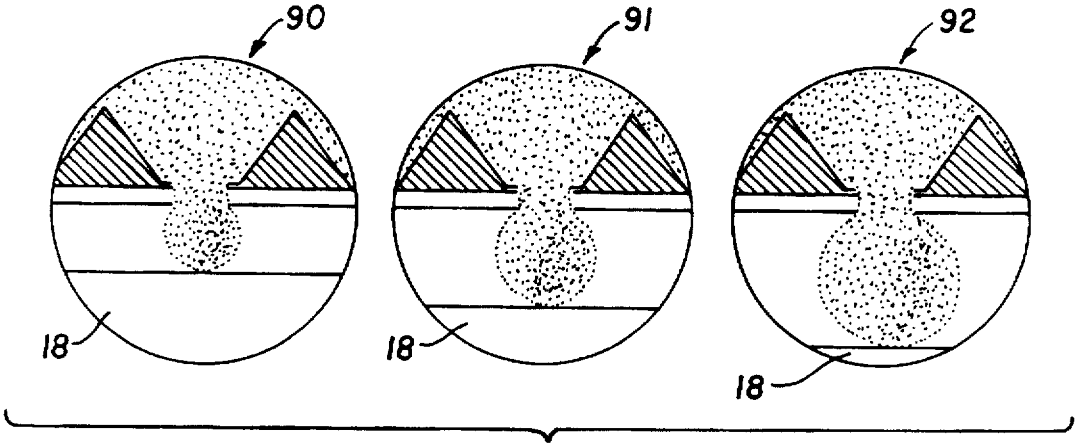

FIG. 2(*b*) shows a schematic enlargement of three nozzles which have been poised prior to transfer to the printing media. The drop volume of ink poised on the three nozzles 90, 91, and 92 increases from left to right in the figure, and is set by increasing application of electrothermal pulses. The volume of ink transferred to the recording medium will be approximately proportional to the poised drop volume.

A paper guide 36 lightly contacts recording medium 18 under pressure provided by an elastically deformable material 35 acting against a fixed block 34. Guide 36 has two purposes: to tension the recording medium against the platen in conjunction with paper transport roller 20, and to temporarily flatten any fibers which may protrude from a recording medium such as paper. It is desirable to flatten protruding fibers to improve print quality by reducing variations in the distance from the printhead to the effective surface of the recording medium. Protruding fibers do not have as significant an affect on the printed dot size as may be implied by the reduced distance from the nozzle to the closed part of the recording medium. This is because the ink drop will not soak into, or wick along the surface of small protruding fibers as fast as it will soak into the bulk surface. Therefore, the time before ink drop separation, and thus the total amount of ink delivered, will not vary greatly. Depending upon the printing speed, the recording medium type, and other aspects of the printing system, paper guide 36 may not be necessary, or may be replaced by tensioned rollers to reduce friction.

An alternative configuration of the apparatus is to use a piezoelectric crystal to alter the position of the printhead in relation to a fixed platen, instead of vice versa. This arrangement is equivalent in function, with no significant disadvantage over the preferred apparatus, except that in many cases it will be more difficult to manufacture.

It is possible to derive many different arrangements of piezoelectric crystal, including arrangements where the crystal operates in shear mode, and arrangements which use multiple stacked layers of piezoelectric crystal to reduce the magnitude of the control voltage required. These variations are obvious to those skilled in the art, and are within the scope of the invention.

In the quiescent state (with no ink drop selected), the ink pressure is insufficient to overcome the ink surface tension and eject a drop. Referring to FIGS. 1(*b*) and 1(*c*), the ink pressure for optimal operation will depend mainly on the nozzle diameter, surface properties (such as the degree of hydrophobicity) of the nozzle bore 46 and the rim 54 of the nozzle, surface tension of the ink, and the power and temporal profile of the heater pulse. A constant ink pressure can be achieved by applying pressure to an ink reservoir 28, FIG. 1(*a*), under the control of an ink pressure regulator 26. Alternatively, for larger printing systems, the ink pressure can be very accurately generated and controlled by situating the top surface of the ink in reservoir 28 an appropriate distance above printhead 16. This ink level can be regulated by a simple float valve (not shown).

The ink is distributed to the back surface of printhead 16 by an ink channel device 30. The ink preferably flows through slots and/or holes etched through the silicon substrate of printhead 16 to the front surface, where the nozzles and heaters are situated.

FIG. 1(*b*) is a detail enlargement of a cross-sectional view of a single nozzle tip of the drop-on-demand ink jet printhead 16 according to a preferred embodiment of the present invention. An ink delivery channel 40, along with a plurality of nozzle bores 46 are etched in a substrate 42, which is silicon in this example. In one example the delivery channel 40 and nozzle bore 46 were formed by anisotropic wet etching of silicon, using a $p^+$ etch stop layer to form the shape of nozzle bore 46. Ink 70 in delivery channel 40 is pressurized above atmospheric pressure, and forms a meniscus 60 which protrudes somewhat above nozzle rim 54, at a point where the force of surface tension, which tends to hold the drop in, balances the force of the ink pressure, which tends to push the drop out.

In this example, the nozzle is of cylindrical form, with a heater 50 forming an annulus. In this example the heater was made of polysilicon doped at a level of about thirty ohms/square, although other resistive heater material could be used. Nozzle rim 54 is formed on top of heater 50 to provide a contact point for meniscus 60. The width of the nozzle rim in this example was 0.6 μcm to 0.8 μm. Heater 50 is separated from substrate 42 by thermal and electrical insulating layers 56 to minimize heat loss to the substrate.

The layers in contact with the ink can be passivated with a thin film layer 64 for protection, and can also include a layer to improve wetting of the nozzle with the ink in order to improve refill time. The printhead surface can be coated with a hydrophobizing layer 68 to prevent accidental spread of the ink across the front of the printhead. The top of nozzle rim 54 may also be coated with a protective layer which could be either hydrophobic or hydrophillic.

FIG. 1(*c*) is an enlargement of a top view of a single nozzle of drop-on-demand ink jet printhead 16 according to a preferred embodiment of the present invention. Nozzle rim 54 and annulus heater 50 located directly under nozzle rim 54 surround the periphery of nozzle bore 46. A set of power and ground connections 59 from the drive circuitry to the heater annulus 50 are shown and are fabricated to lie in the heater plane below the nozzle rim.

For small drop sizes, gravitational force on the ink drop is very small; approximately $10^{-4}$ of the surface tension forces, so gravity can be ignored in most cases. This allows printhead 16 and recording medium 18 to be oriented in any direction in relation to the local gravitational field. This is an important requirement for portable printers.

The ink has a surface tension decrease with temperature such that heat transferred from the heater to the ink after application of an electrothermal pulse will result in the expansion of poised meniscus 60. In addition, it is desirable that the ink have the ability to remain expanded at a fixed volume for a predetermined time period after the electrothermal pulse has terminated, such as for example a period of about 100 μsec or longer. Such an ink exhibiting this property contains surfactant sols comprising mixtures of solid surfactants such as carboxylic acids. Commonly assigned U.S. patent application Ser. No. 08/777,133 INK COMPOSITION CONTAINING SURFACTANT SOLS COMPRISING MIXTURES OF SOLID SURFACTANTS filed in the name of P. Bagchi et al. on Dec. 30, 1996, discloses such an ink composition. The disclosure of the Bagchi et al. application is hereby specifically incorporated by reference into the present disclosure.

Experimental Results

Figure 3:
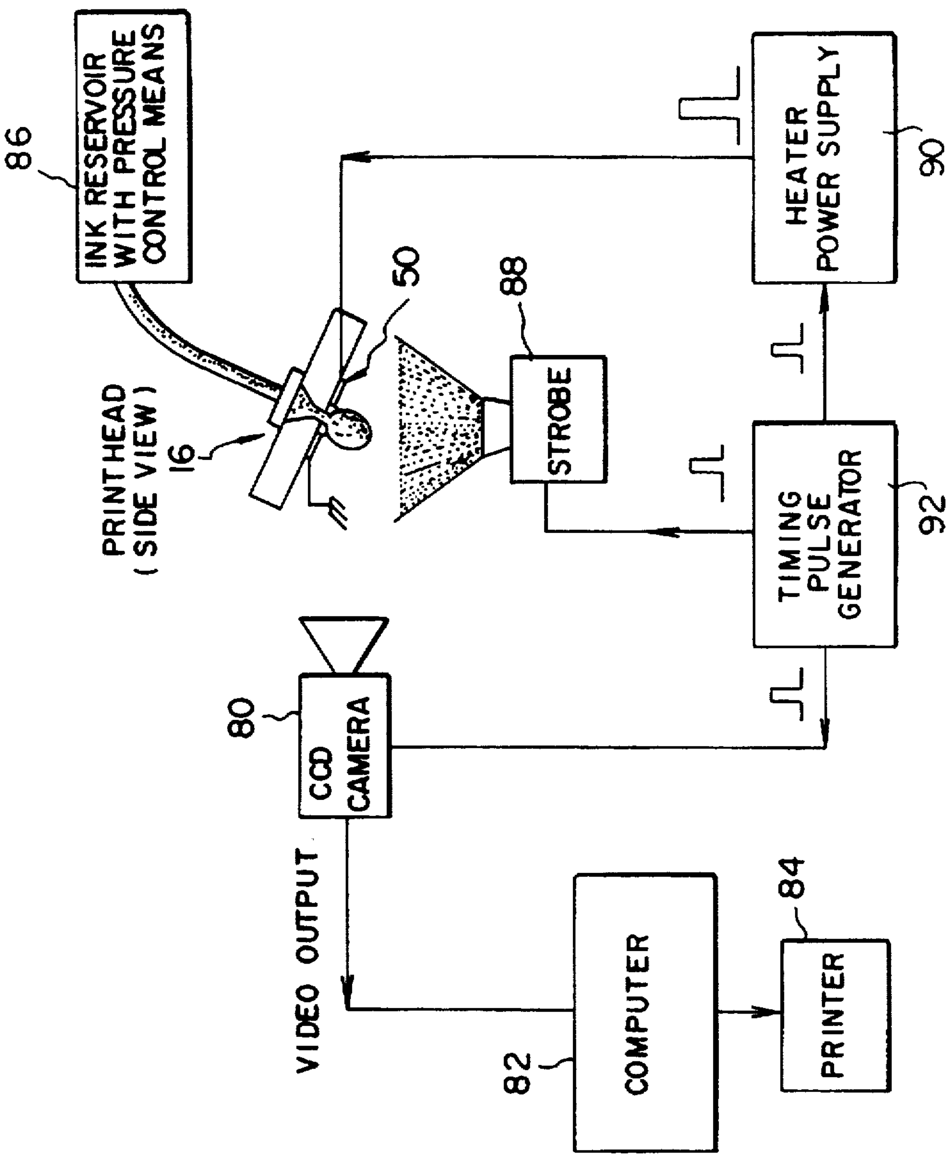
FIG. 3 shows a simplified block schematic diagram of the experimental setup used to test the present invention.

An ink jet printhead with drop separation means such as shown schematically in FIGS. 1(*b*) and 1(*c*) was fabricated as described above and experimentally tested. A schematic diagram of the experimental set up used to image drops emitted from printhead 16 is shown in FIG. 3. A CCD camera 80 connected to a computer 82 and a printer 84 is used to record images of the drop at various delay times relative to a heating pulse. Ink jet printhead 16 is angled at thirty degrees from the horizontal so that the entire heater 50 can be viewed. Because of the reflective nature of the surface, a reflected image of the drop appears together with the imaged drop. An ink reservoir and pressure control means 86 shown as one unit is included to poise the ink meniscus at a point below the threshold of ink release. A fast strobe 88 is used to freeze the image of the drop in motion. A heater power supply 90 is used to provide a current pulse to heater 50. Strobe 88, camera 80, and heater power supply 90 may be synchronously triggered by a timing pulse generator 92. In this way, the time delay between strobe 88 and heater power supply 90 may be set to capture the drop at various points during its formation.

A 20 μm diameter nozzle, fabricated as described above and shown schematically in FIG. 1(*b*) and 1(*c*), was mounted in the test setup shown schematically in FIG. 3. The nozzle reservoir was filled with the test fluid. The fluid used to obtain these results has been described in Examples 1 through 3 of afore-mentioned Bagchi et al. application, and contained a mixed carboxylic acid as the surface active agent.

FIG. 4(*a*) is an image of meniscus 60 poised on nozzle rim 54 by pressurizing reservoir 86 to 9.44 kPa, below the measured critical pressure of 13.6 kPa. Note that the image is taken at a tilt of thirty degrees from horizontal with a reflected image of the poised meniscus also appearing. Also labeled on the image are electrodes 59.

FIG. 4(*b*) is an image taken of the meniscus about one milli-second after the application of five, 10 μs duration pulses, each at a power level of 90 mW applied to heater 50. This is a comparably low power level, allowing the printhead to be page-width length. The local increase in temperature caused by the thermal energy from the heater has changed some of the physical properties of the fluid including decreasing the surface tension. The surface tension reduction causes meniscus 60 to move further out of the nozzle. The meniscus remains essentially frozen in this position long after the termination of the electrothermal pulses. This unexpected and novel observation provides the basis for the ink proximity printing apparatus.

Application of nine more 10 μs duration pulses results in the image of FIG. 4(*c*). The meniscus has expanded even further, and again remains essentially frozen in this position long after the termination of the electrothermal pulses.

As can be concluded from FIGS. 4(*a*) to 4(*c*), a range of meniscus sizes, and hence volumes, may be obtained by application of a predetermined number and duration of electrothermal pulses.

Figure 5:
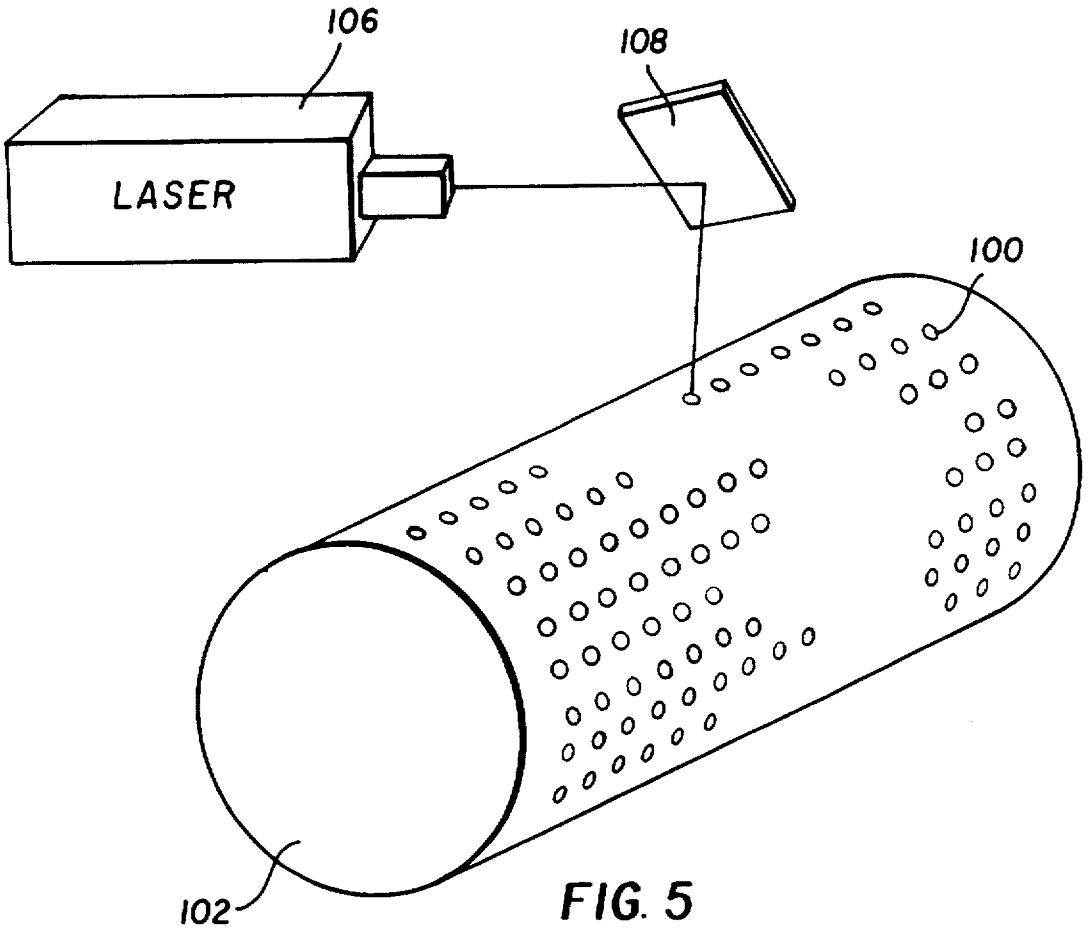
FIG. 5 is a three-dimensional diagram of an ink transfer system in which the nozzles are located on the transfer roller according to the present invention.

FIG. 5 illustrates an alternative structural implementation for an ink transfer device with a nozzle array 100 located on a drum 102 which contains the ink reservoir inside the drum. Thermal activation of the ink in selected nozzles can be accomplished by placing electrical heaters at each nozzle. In an alternative embodiment, the ink poised on nozzles can be optically heated by using a laser beam 106 reflected off of a mirror 108 to scan the nozzles as depicted schematically in FIG. 5.

In alternative embodiment, an intermediate transfer surface could be used in place of the paper transport system to facilitate transfer of the ink drops to the recording medium. The intermediate transfer surface will have a known quality and absorptivity such that the ink will cleanly transfer to the intermediate transfer surface. Such transfer roller technology is well known in the art.

The invention has been described in detail with particular reference to preferred embodiments thereof, but it will be understood that variations and modifications can be effected within the spirit and scope of the invention.

What is claimed is:

1. An ink transfer printing device comprising:

a source of liquid ink under pressure and having a surface tension, the ink containing a surface-active agent that is thermally released;

a nozzle in communication with the ink source, the nozzle having a tip such that a meniscus of ink is poised at the nozzle tip with a predetermined volume of ink in the meniscus; and a thermal activator in thermal communication with the ink of the meniscus, the thermal activator, when activated by a selectably-variable control signal, heats the ink of the meniscus to thereby release the surface-active agent, reducing the surface tension of the ink and expanding the poised meniscus on the nozzle tip for transfer to a print medium, the ink having a characteristic which causes the meniscus to remain expanded at a stable predetermined volume for a predetermined time period after the electrothermal pulse has terminated.

2. An ink transfer printing device as set forth in claim 1, wherein the thermal activator is controlled by electrothermal pulses.

3. An ink transfer printing device as set forth in claim 2, wherein electrothermal pulses required to control drop volume are at a comparably low power level, allowing the printhead to be page-width length.

4. An ink transfer printing device as set forth in claim 1, wherein the selectably-variable control signal permits continuous toning and gray scale toning to be accomplished by the transfer to a print medium.

5. An ink transfer printing device as set forth in claim 1, wherein the ink's material properties are such that the expanded state may be halted at a predetermined point and remain so for many seconds after the electrothermal pulse has terminated, thus forming ink drops of predetermined size and volume.

6. An ink transfer printing device as set forth in claim 1, wherein the predetermined time period is at least about 100 μsec.

7. A process for ink transfer printing from a nozzle, having a critical pressure at which a meniscus of ink cannot be maintained poised at the nozzle tip, said process comprising:

providing ink containing a surface-active agent at the nozzle;

pressurizing the ink at above atmospheric pressure but below the critical pressure of the nozzle to form a meniscus, whereby pressure of the ink determines a quiescent meniscus height at the nozzle;

thermally controlling release of the surface-active agent contained in the ink, thereby causing the surface-active agent in the ink to cause an expansion at the meniscus, increasing its height and volume;

halting the thermally controlling release of the surface-active agent at a predetermined point, and wherein the ink's material properties are such that the expanded state remains stable for a predetermined time period after termination of the release of the surface-active agent, thus forming ink drops of predetermined size and volume; and transferring a pre-configured ink volume to printing media.

8. A process for ink transfer printing as set forth in claim 7, wherein the step of controlling release of the surface-active agent includes selectively applying a thermal pulse to the ink in the nozzle.

9. A process for ink transfer printing as set forth in claim 7, wherein the step of controlling release of the surface-active agent includes causing the surface-active agent to move to the surface of the ink, where a corresponding decrease in surface tension causes the expansion of the meniscus.

10. A process for ink transfer printing as set forth in claim 7, wherein the predetermined time period is at least about 100 μsec.

* * * * *